United States Patent
Suzuki et al.

(10) Patent No.: US 10,305,337 B2
(45) Date of Patent: May 28, 2019

(54) PERMANENT MAGNET TYPE ROTATING ELECTRIC MACHINE

(71) Applicant: KABUSHIKI KAISHA TOYOTA JIDOSHOKKI, Aichi-ken (JP)

(72) Inventors: Noriyuki Suzuki, Kariya (JP); Yoshiyuki Nakane, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 150 days.

(21) Appl. No.: 15/451,991

(22) Filed: Mar. 7, 2017

(65) Prior Publication Data

US 2017/0264151 A1 Sep. 14, 2017

(30) Foreign Application Priority Data

Mar. 10, 2016 (JP) ................. 2016-046821

(51) Int. Cl.
| | |
|---|---|
| *H02K 1/27* | (2006.01) |
| *H02K 21/16* | (2006.01) |
| *H02K 7/14* | (2006.01) |
| *H02K 29/03* | (2006.01) |

(52) U.S. Cl.
CPC ............. *H02K 1/272* (2013.01); *H02K 1/276* (2013.01); *H02K 7/14* (2013.01); *H02K 21/16* (2013.01); *H02K 29/03* (2013.01)

(58) Field of Classification Search
CPC .......... H02K 1/272; H02K 21/16; H02K 7/14; H02K 1/276; H02K 29/03
USPC ..................................... 310/156.11
See application file for complete search history.

(56) References Cited

U.S. PATENT DOCUMENTS

| | | | | |
|---|---|---|---|---|
| 4,464,596 | A | * | 8/1984 | Miller ................... H02K 1/276 310/156.52 |
| 4,916,346 | A | * | 4/1990 | Kliman ................. H02K 1/246 310/156.51 |
| 6,047,461 | A | | 4/2000 | Miura et al. |
| 2008/0272667 | A1 | * | 11/2008 | Ionel ..................... H02K 1/276 310/156.83 |
| 2011/0030419 | A1 | | 2/2011 | Kikuchi et al. |
| 2012/0091845 | A1 | | 4/2012 | Takemoto et al. |

(Continued)

FOREIGN PATENT DOCUMENTS

| | | |
|---|---|---|
| JP | H 11-89142 | 3/1999 |
| JP | 2008-206308 | 9/2008 |

(Continued)

*Primary Examiner* — Alex W Mok
(74) *Attorney, Agent, or Firm* — Greenblum & Bernstein, P.L.C.

(57) ABSTRACT

A permanent magnet type rotating electric machine includes a stator, a rotor core, and permanent magnets embedded in the rotor core. The permanent magnets include N-pole magnets, having N-poles opposed to the stator, and S-pole magnets, having S-poles opposed to the stator. The N-pole magnets are arranged adjacent to each other, and the S-pole magnets are arranged adjacent to each other. The outer circumferential portion of the rotor core includes a first N-pole corresponding section corresponding to an N-pole magnet that is not adjacent to an S-pole magnet and is partially wider in the radial direction than a second N-pole corresponding section that corresponds to an N-pole magnet that is adjacent to one of the S-pole magnets.

8 Claims, 3 Drawing Sheets

(56) References Cited

U.S. PATENT DOCUMENTS

| | | | | |
|---|---|---|---|---|
| 2012/0133239 A1* | 5/2012 | Taema | ............... | H02K 1/276 310/216.094 |
| 2012/0175987 A1* | 7/2012 | Takemoto | ............ | H02K 1/276 310/156.08 |
| 2013/0169094 A1* | 7/2013 | Lee | ............ | H02K 1/276 310/156.01 |
| 2014/0091663 A1* | 4/2014 | Hazeyama | ............ | H02K 1/276 310/156.11 |
| 2014/0191628 A1* | 7/2014 | Nakano | ............ | H02K 1/2746 310/68 B |
| 2015/0222152 A1* | 8/2015 | Yamada | ............ | H02K 5/02 310/68 B |
| 2016/0352162 A1* | 12/2016 | Mochida | ............ | H02K 21/14 |

FOREIGN PATENT DOCUMENTS

| | | |
|---|---|---|
| JP | 2011-41379 | 2/2011 |
| JP | 2012-110214 | 6/2012 |
| JP | 5747385 | 7/2015 |

* cited by examiner

PERMANENT MAGNET TYPE ROTATING ELECTRIC MACHINE

BACKGROUND

The present invention relates to a permanent magnet type rotating electric machine and, more particularly, to a permanent magnet type rotating electric machine in which permanent magnets are embedded in a rotor core.

In a three-phase AC induction motor, the rotation speed is inversely proportional to the number of phases. Thus, two phases are preferable for high-speed rotation. In a two phase interior permanent magnet (IPM) motor rotating at a high speed, the centrifugal force applied to the permanent magnets increases the stress applied to the rotor core. When the rotor core is thin at a portion between the permanent magnets and the outer circumferential surface of the rotor core, stress may break the rotor core.

The thickness of the rotor core may be increased at the portion between the permanent magnets and the outer circumferential surface of the rotor core to prevent breakage of the rotor. However, this will lower the torque. Further, the rotor core will be enlarged. This will increase the size of the IPM motor.

The IPM motor may have substantially two poles in which each pole corresponds to a plurality of permanent magnets so that centrifugal force acting on the individual permanent magnets is reduced. However, this will increase leakage flux and lower the torque.

Japanese Laid-Open Patent Publication No. 2012-110214 describes a brushless motor provided with a rotor that includes a plurality of magnet pole portions arranged in the circumferential direction of the rotor core to limit demagnetization and to increase the torque and improve the rotation performance. An N-pole magnet is embedded in each magnet pole portion. The rotor core includes a core pole portion that functions as an S-pole between the magnet pole portions that are adjacent in the circumferential direction. Gaps extend between the core pole portions and the magnet pole portions. The gaps between the magnet pole portions and the core pole portions extend toward the radially outer side of the magnets.

SUMMARY

In the motor of Japanese Laid-Open Patent Publication No. 2012-110214, the core pole portions that function as the S-poles exist between the N-pole permanent magnets. That is, the magnet pole portions and the core pole portions are alternately arranged in the circumferential direction. The number of poles in the motor is the total of the number of the magnet pole portions and the number of the core pole portions. Thus, in the structure described in Japanese Laid-Open Patent Publication No. 2012-110214, a motor having substantially two poles cannot be realized. Further, Japanese Laid-Open Patent Publication No. 2012-110214 does not disclose or hint manufacturing an IPM motor having substantially two poles in which each pole corresponds to a plurality of permanent magnets, which will increase leakage flux and lower the torque.

It is an object of the present invention to provide a permanent magnet type rotating electric machine that allows for high-speed rotation, increases the torque, and improves torque pulsation.

To achieve the above object, the present invention provides a permanent magnet type rotating electric machine including a stator, a rotor core including magnet insertion holes, and permanent magnets respectively inserted into the magnet insertion holes and fixed to the rotor core. The permanent magnets include N-pole magnets, each of which an N-pole is opposed to the stator, and S-pole magnets, each of which an S-pole is opposed to the stator. Three or more of the N-pole magnets are arranged adjacent to one another in a circumferential direction and form a first set. Three or more of the S-pole magnets are arranged adjacent to one another in the circumferential direction and form a second set. The first set and the second set are arranged along the same circumference. The rotor core includes an outer circumferential portion located at an outer side of the magnet insertion holes in a radial direction. The outer circumferential portion includes a first N-pole corresponding section that corresponds to one of the N-pole magnets that is not adjacent to any of the S-pole magnets, a second N-pole corresponding section that corresponds to one of the N-pole magnets that is adjacent to one of the S-pole magnets, a first S-pole corresponding section that corresponds to one of the S-pole magnets that is not adjacent to any of the N-pole magnets, and a second S-pole corresponding section that corresponds to one of the S-pole magnets that is adjacent to one of the N-pole magnets. At least part of the first N-pole corresponding section is wider in the radial direction than the second N-pole corresponding section, and at least part of the first S-pole corresponding section is wider in the radial direction than the second S-pole corresponding section.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of the present invention will now be described with reference to FIGS. 1A to 3.

Figure 1A:
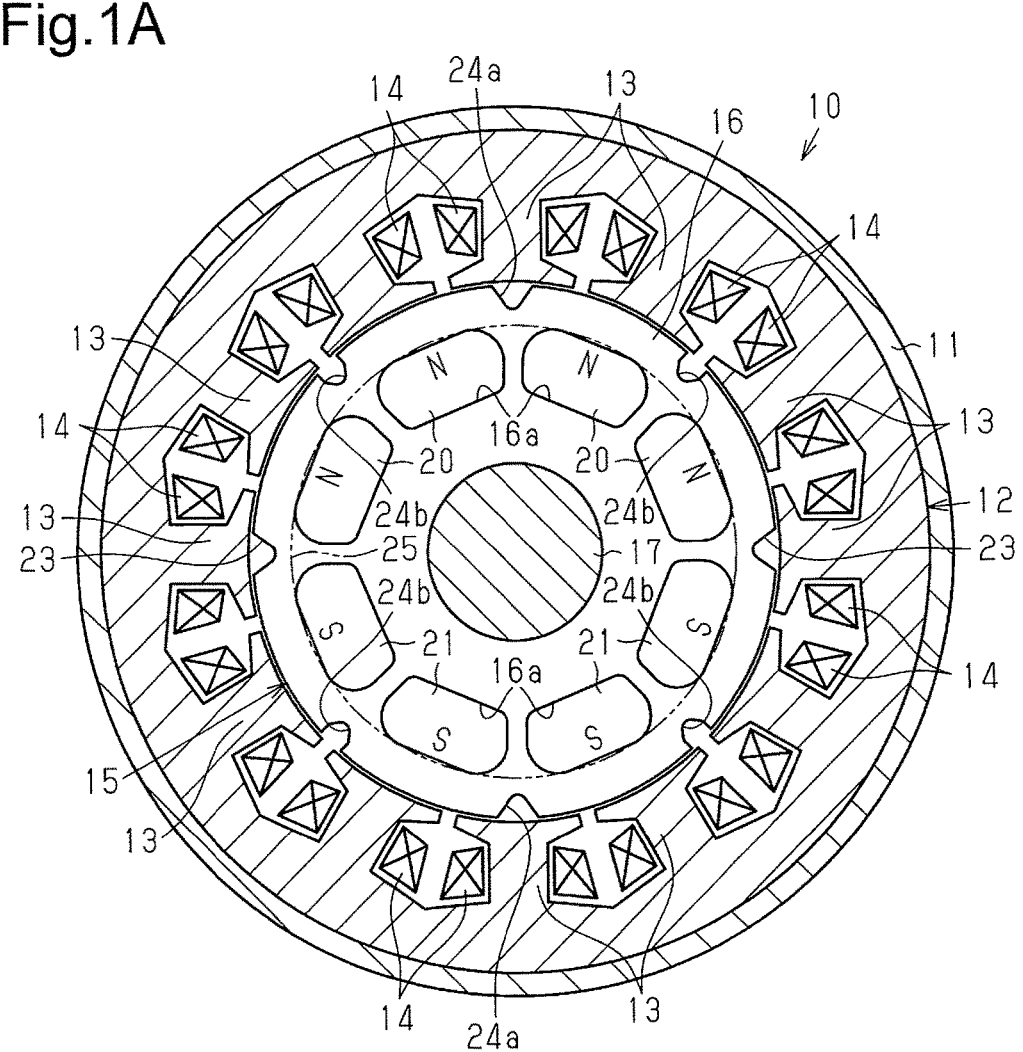
FIG. 1A is a schematic cross-sectional view of a rotating electric machine.

As shown in FIG. 1A, an IPM motor 10 (interior permanent magnet type rotating electric machine) that serves as a permanent magnet type rotating electric machine includes a housing 11 and a tubular stator 12, which is fixed to the inner circumferential surface of the stator 12. The stator 12 includes teeth 13 that extend radially inward and are arranged at equal angular intervals. Coils 14 are wound around the teeth 13.

A rotor 15 is arranged at a radially inner side of the stator 12. The rotor 15 includes a rotor core 16, which is formed by stacking a plurality of (e.g., several tens of) circular magnetic steel sheets. A rotation shaft 17 is fitted into and fixed to the center of the rotor core 16 so as to be rotatable integrally with the rotor core 16. The rotation shaft 17 is supported by bearings (not shown) and rotatable relative to the housing 11. The rotor core 16 includes magnet insertion holes 16a. Permanent magnets 20 and 21 are inserted into and fixed to the magnet insertion holes 16a. In this manner, the IPM motor 10 includes the stator 12, the rotor core 16 including the magnet insertion holes 16a, the permanent magnets 20 and 21 inserted into the magnet insertion holes 16a and fixed to the rotor core 16, and the rotation shaft 17 fixed to the rotor core 16.

The permanent magnets 20 are arranged along the same circumference over one-half of the rotor core 16, and the permanent magnets 21 are arranged along the same circumference over the remaining half of the rotor core 16. That is, the rotor 15 includes the permanent magnets 20 and 21 that are arranged on the same circumference. More specifically, the rotor 15 includes the permanent magnets 20, each serving as an N-pole magnet in which the N-pole is opposed to the stator 12, and the permanent magnets 21, each serving as an S-pole magnet, in which the S-pole is opposed to the stator 12. A first set of N-pole magnets (permanent magnets 20), arranged adjacent to one another in the circumferential direction, and a second set of S-pole magnets (permanent magnets 21), arranged adjacent to one another in the circumferential direction, are fixed to the rotor core 16 along the same circumference. The permanent magnets 20 and 21 have the same size, and the permanent magnets 20 and the permanent magnets 21 are located at symmetric positions in the rotor core 16. The permanent magnets 20 are three or more in number, and the permanent magnets 21 are three or more in number. In this embodiment, there are four permanent magnets 20 and four permanent magnets 21.

The outer circumferential portion of the rotor core 16 includes generally V-shaped grooves 23 at locations corresponding to positions between the set of the permanent magnets 20 and the set of the permanent magnets 21 that are adjacent to each other in the circumferential direction. Further, in the outer circumferential portion of the rotor core 16, among the three locations corresponding to positions between the N-pole magnets 20 that are adjacent to one another in the circumferential direction, the middle location includes a generally V-shaped groove 24a and the two remaining locations each include a groove 24b, which is narrower than the groove 24a.

The grooves 23, 24a, and 24b each include a bottom surface located at a radially outer side of the hypothetical line 25 that connects the outer surfaces of the permanent magnets 20 and 21. Among the two surfaces of each of the permanent magnets 20 and 21 that extend in a direction intersecting the radial direction of the rotor core 16, the outer surface of each of the permanent magnets 20 and 21 refers to the surface that is closer to the outer circumferential surface of the rotor core 16. That is, the outer surface of each of the permanent magnets 20 and 21 refers to the radially outer surface.

Figure 1B:
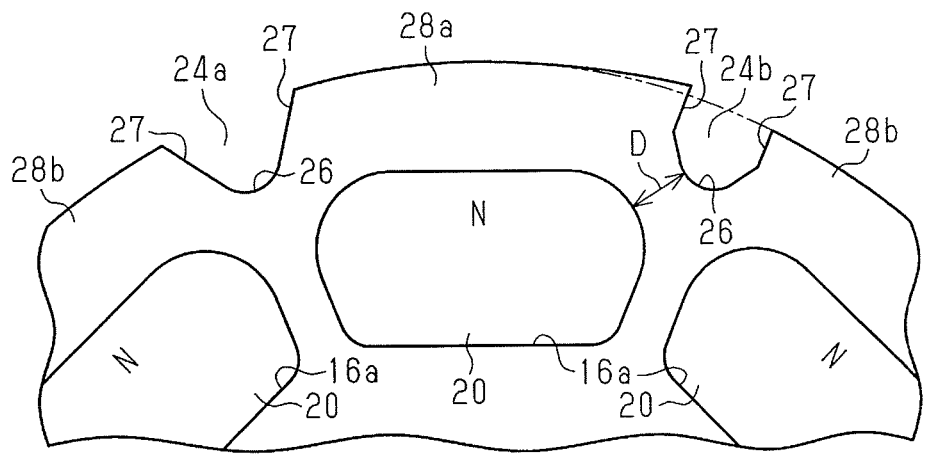
FIG. 1B is an enlarged view showing a portion of a rotor in the rotating electric machine of FIG. 1A.
Figure 1C:
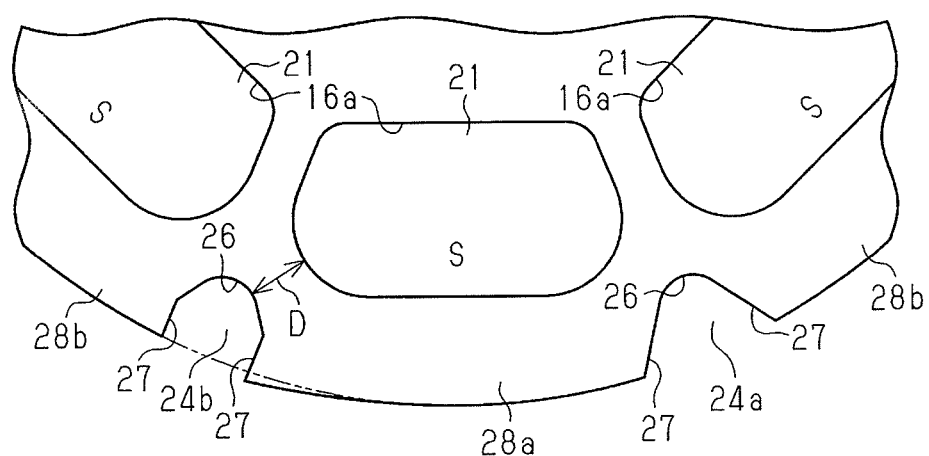
FIG. 1C is an enlarged view showing a portion of the rotor in the rotating electric machine of FIG. 1A.

As shown in FIGS. 1B and 1C, each groove 24a includes an arcuate bottom surface 26 and two side surfaces 27 that are continuous with the bottom surface 26. The side surfaces 27 are planar surfaces that are smoothly continuous with the arcuate bottom surface 26. The distance increases between the side surfaces 27 as the bottom surface 26 becomes farther. Thus, the groove 24a has a generally V-shaped cross-section. Each groove 24b includes a bottom surface 26 that has the same radius of curvature as the bottom surface 26 of each groove 24a. Further, each groove 24b has a generally U-shaped cross-section so that the width of the groove 24b is narrower than the width of each groove 24a.

The width at the open end of each groove 24b is narrower than the width at the open end of each groove 24a. In detail, each side surface 27 of the groove 24b includes a planar surface that is smoothly continuous with the bottom surface 26, which is arcuate like that of the groove 24a, and a planar surface that extends parallel to a hypothetical plane that bisects the groove 24b.

As shown in FIG. 1A, the rotor core 16 includes the four permanent magnets 20 (N-pole magnets) that are successively arranged in the circumferential direction. A rotor core portion 28a is defined in the outer circumferential portion of the rotor core 16 at a location opposing the second permanent magnet 20 from the right among the four magnets 20. Rotor core portions 28b are defined in the outer circumferential portion of the rotor core 16 at locations opposing the permanent magnets 20 that are adjacent to the second permanent magnet 20. Referring to FIG. 1B, the rotor core portion 28a is at least partially thicker than the rotor core portions 28b. The rotor core portions 28a and 28b each includes a leading end, which is located at the leading side in the rotation direction of the rotor core 16, and a trailing end, which is located at the trailing side in the rotation direction of the rotor core 16. In the present embodiment, the thickness of the rotor core portion 28a from the trailing end to near the middle portion between the trailing end and the leading end is uniform and the same as the thickness of each rotor core portion 28b. The thickness of the rotor core portion 28a gradually increases from the middle portion toward the leading end. As shown in FIG. 1C the part of the outer circumferential portion of the rotor core 16 opposing the S-pole magnets 21 is symmetric to the part of the outer circumferential portion of the rotor core 16 opposing the N-pole magnets 20.

More specifically, the rotor core 16 includes the outer circumferential portion located at the radially outer side of the magnet insertion holes 16a. The outer circumferential portion includes a first N-pole corresponding section, a second N-pole corresponding section, a first S-pole corresponding section, and a second S-pole corresponding section. The first N-pole corresponding section corresponds to an N-pole magnet (permanent magnets 20) that is not adjacent to any of S-pole magnets (permanent magnets 21). The second N-pole corresponding section corresponds to an N-pole magnet that is adjacent to one of S-pole magnets. The first S-pole corresponding section corresponds to an S-pole magnet that is not adjacent to any of N-pole magnets. The second S-pole corresponding section corresponds to an S-pole magnet that is adjacent to one of N-pole magnets. The first N-pole corresponding section is at least partially wider in the radial direction than the second N-pole corresponding section. Further, the first S-pole corresponding section is at least partially wider in the radial direction than the second S-pole corresponding section.

The first N-pole corresponding section refers to a section opposing the radially outer surface of the N-pole magnet, that is, the rotor core portion 28a between the grooves 24a and 24b. In the same manner, the first S-pole corresponding section refers to a section opposing the radially outer surface of the S-pole magnet, that is, the rotor core portion 28a between the grooves 24a and 24b.

The operation of the IPM motor 10 will now be described.

When the IPM motor 10 is driven under a load condition, current is supplied to the coils 14 of the stator 12. This generates a rotating magnetic field at the stator 12 that acts on the rotor 15. The magnetic attraction force and magnetic repulsion force between the rotating magnetic field and the permanent magnets 20 and 21 rotates the rotor 15 synchronously with the rotating magnetic field.

In order for the magnetic flux generated at the permanent magnets 20 (N-pole magnets), of which the N-poles are opposed to the stator 12, to efficiently contribute to the rotation of the rotor 15, the magnetic flux generated at the permanent magnets 20 needs to be input to a tooth 13 and flow via a different tooth 13 into the permanent magnets 21 (S-pole magnets), of which the S-poles are opposed to the stator 12.

In a case in which the outer circumferential surface of the rotor core 16 does not include the grooves 24a and 24b, some of the magnetic flux generated at the permanent magnets 20 is apt to flow through the portion of the rotor core 16 between the surface of the rotor core 16 and the surface of each permanent magnet 20 opposing the stator 12. However, in a case in which the outer circumferential surface of the rotor core 16 includes the grooves 24a and 24b, the flow of the magnetic flux generated at the permanent magnets 20 is restricted in the circumferential direction of the rotor core 16 by the grooves 24a and 24b. Thus, the magnetic flux efficiently flows toward the stator 12. Further, the magnetic flux flowing from the teeth 13 to the rotor 15 is apt to flow toward the permanent magnets 21, of which the S-poles are opposed to the stator 12, and into the rotor core 16. In addition, the magnetic path between the same poles (portion of distance D) is narrowed to reduce leakage flux. Thus, the magnetic flux generated at the permanent magnets 20 efficiently flows toward the stator 12 and increases the torque.

When using vector lines to indicate the teeth torque, which is the total of the rotation direction components of the surface force applied to each stator tooth, the length and direction of vector lines change at locations corresponding to the grooves 24a and 24b. The size of the vectors at locations corresponding to the grooves 24a and 24b is larger at the locations corresponding to the grooves 24b having generally U-shaped cross sections than locations corresponding to the grooves 24a having generally V-shaped cross sections. Further, the vectors rise toward the stator 12 at the locations corresponding to the grooves 24b having generally U-shaped cross sections.

At two opposite sides of each groove 24b in the circumferential direction, the size and direction of the vector lines at locations corresponding to each groove 24b differs between when the distance from the center of the rotor core 16 to the circumference of the rotor core is the same and when the distance is different.

Figure 2A:
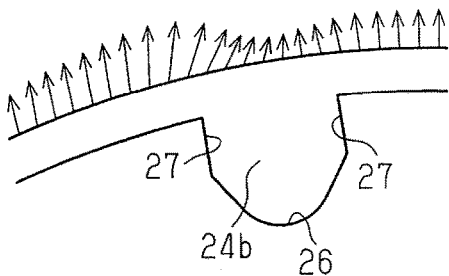
FIG. 2A is a vector diagram of the surface force when a rotor core portion has a uniform thickness.
Figure 2B:
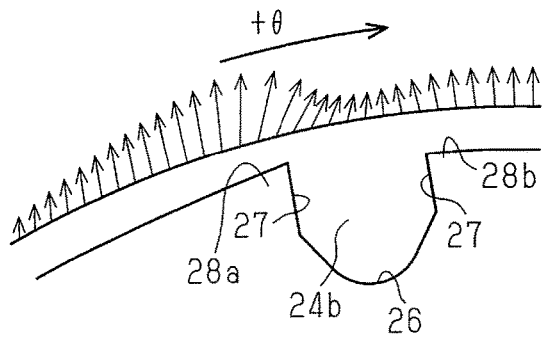
FIG. 2B is a vector diagram of the surface force when the rotor core portion is partially thicker than the rotor core portion of FIG. 2A.

FIG. 2A shows the vectors at locations in the rotor core 16 corresponding to a groove 24b and the front of and rear of the groove 24b when the distance from the center of the rotor core 16 to the circumference of the rotor core 16 is the same at the two circumferentially opposite sides of the groove 24b. FIG. 2B shows the vectors at locations in the rotor core 16 corresponding to the groove 24b when the distance from the center of the rotor core 16 to the circumference of the rotor core 16 is different at the two circumferentially opposite sides of the groove 24b. In the example of FIG. 2B, the rotor core portion 28a having a large thickness (radial width) is located at the left side (trailing side with respect to the rotation direction of rotor core 16) of the groove 24b, and the rotor core portion 28b having a small thickness (radial width) is located at the right side (leading side with respect to rotation direction of rotor core 16) of the groove 24b.

As shown in FIGS. 2A and 2B, in the vectors at locations corresponding to the groove 24b having the generally U-shaped cross-section, the vectors located further toward the trailing side from the side surface 27 at the trailing side (left side) are larger than the other vectors. However, the vectors are larger in FIG. 2B in which the two side surfaces 27 have different heights than FIG. 2A in which the two side surfaces have the same height. Thus, as shown in FIG. 2B, in the case in which the two side surfaces 27 have different heights, the surface force (teeth torque) is increased in strength in the +θ direction at locations corresponding to the higher side surface 27. As a result, the magnetic flux generated from the corresponding permanent magnet 20 flows in a concentrated manner toward the stator 12 from the corner of the thick rotor core portion 28a and increases the torque.

Figure 3:
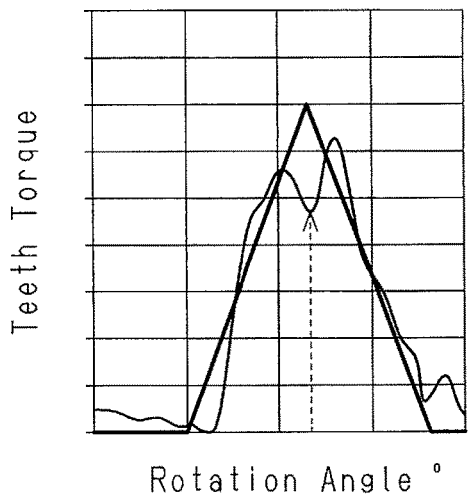
FIG. 3 is a graph showing the relationship of the rotation angle and the teeth torque.

FIG. 3 shows the relationship of the teeth torque and the rotation angle. In FIG. 3, the bold line shows the ideal change of the teeth torque, and the fine line shows the actual change of the teeth torque. As shown in FIG. 2B, when the two side surfaces 27 of the groove 24b have different heights, the surface force (teeth torque) is increases in the +θ direction at locations corresponding to the higher side surface 27 and decreases in the −θ direction at locations corresponding to the lower side surface 27. Thus, in FIG. 3, in the fine line indicating the actual change of the teeth torque, the value increases at the location indicated by the arrow and approaches the ideal line.

The present embodiment has the advantages described below.

(1) The IPM motor 10 (permanent magnet type rotating electric machine) includes the rotor 15 that includes the rotor core 16 into which the permanent magnets 20 and 21 are embedded. The permanent magnets 20 and 21 are arranged on the same circumference. Three or more of the permanent magnets 20 (N-pole magnets), of which the N-poles are opposed to the stator 12, are arranged adjacent to one another in the circumferential direction. Three or more of the permanent magnets 21 (S-pole magnets), of which the S-poles are opposed to the stator 12, are arranged adjacent to one another in the circumferential direction. In the circumferential direction, the rotor core portion 28a, which is where the outer circumferential portion of the rotor core 16 is opposed to the middle one of the three adjacent N-pole magnets 20, is at least partially thicker than the rotor core portions 28b, which is where the outer circumferential portion of the rotor core 16 is opposed to the N-pole magnets 20 that are adjacent to the middle one in the circumferential direction. Further, in the circumferential direction, the rotor core portion 28a, which is where the outer circumferential portion of the rotor core 16 is opposed to the middle one of the three adjacent S-pole magnets 21, is at least partially thicker than the rotor core portions 28b, which is where the outer circumferential portion of the rotor core 16 is opposed to the S-pole magnets 21 that are adjacent to the middle one in the circumferential direction.

The IPM motor 10 (permanent magnet type rotating electric machine) includes the stator 12, the rotor core 16 including the magnet insertion holes 16a, the permanent magnets 20 and 21 that are inserted into the magnet insertion holes 16a and fixed to the rotor core 16, and the rotation shaft 17 fixed to the rotor core 16. The permanent magnets 20 and 21 include the N-pole magnets (permanent magnets 20), of which the N-poles are opposed to the stator 12, and the S-pole magnets (permanent magnets 21), of which the S-poles are opposed to the stator 12. Three or more N-pole magnets are arranged adjacent to one another in the circumferential direction and form the first set, and three or more S-pole magnets are arranged adjacent to one another in the circumferential direction and form the second set. The first set and the second set are arranged on the same circumference. The outer circumferential portion of the rotor core 16 is defined by the portion located at the radially outer side of the magnet insertion holes 16*a*. The outer circumferential portion includes a first N-pole corresponding section, which corresponds to an N-pole magnet that is not adjacent to an S-pole magnet, a second N-pole corresponding section, which corresponds to an N-pole magnet that is adjacent to an S-pole magnet, a first S-pole corresponding section, which corresponds to an S-pole magnet that is not adjacent to an N-pole magnet, and a second S-pole corresponding section, which corresponds to an S-pole magnet that is adjacent to an N-pole magnet. The first N-pole corresponding section is at least partially wider in the radial direction than the second N-pole corresponding section. The first S-pole corresponding section is at least partially wider in the radial direction than the second S-pole corresponding section.

The IPM motor 10 includes a total of six or more of the permanent magnets 20 and 21. However, the permanent magnets 20 of which the N-poles are opposed to the stator 12 are arranged next to one another, and the permanent magnets 21 of which the S-poles are opposed to the stator 12 are arranged next to one another. Thus, the IPM motor 10 functions as a rotating electric machine having substantially two poles and is thus suitable for high-speed rotation. Further, the first N-pole corresponding section is at least partially wider in the radial direction than the second N-pole corresponding section, and the first S-pole corresponding section is at least partially wider in the radial direction than the second S-pole corresponding section. Thus, the flow of magnetic flux from the N-pole magnet 20 corresponding to the first N-pole corresponding section toward the stator 12 is more concentrated than the flow of magnetic flux from the other permanent magnets 20 toward the other rotor core portions. This increases the torque. Thus, with the IPM motor 10, high-speed rotation may be performed, the torque is increased, and torque pulsation is improved.

(2) The rotor core portion 28*a* is thicker at the leading end. Magnetic flux flows from the N-pole magnet 20 toward the stator 12 in a manner concentrated at the leading end and does not uniformly flow from the rotor core 16 toward the stator 12. Thus, instead of uniformly increasing the width (thickness) of the rotor core portion 28*a*, the width (thickness) is increased only at the leading end. This reduces loss and weight and obtains the torque-increasing effect compared to when uniformly increasing the thickness of the rotor core 16.

(3) The outer circumferential portion of the rotor core 16 includes the grooves 24*a* and 24*b* between the permanent magnets 20, of which the N-poles are opposed to the stator 12, and the permanent magnets 21, of which the S-poles are opposed to the stator 12. This restricts the flow of magnetic flux in the circumferential direction of the rotor core 16 from the permanent magnets 20 toward the stator 12. Thus, the magnetic flux efficiently flows to the stator 12. Further, the narrowed magnetic path between the same poles reduces leakage flux. Thus, with the IPM motor 10, the torque is increased, and torque pulsation is improved.

(4) Among three or more of the permanent magnets 20 (permanent magnets 21), of which the same poles are opposed to the stator 12, arranged successively in the circumferential direction, when the one located between two permanent magnets 20 (permanent magnets 21) is referred to as a first permanent magnet 20 (permanent magnet 21) and the ones located at two opposites sides of the first permanent magnet 20 (permanent magnet 21) in the circumferential direction are referred to as the second and third permanent the width of the groove 24*b* located in the outer circumferential surface of the rotor core 16 at a position corresponding to a position between the first and second permanent magnets 20 (permanent magnets 21) is narrower than the width of the groove 24*a* located in the outer circumferential surface of the rotor core 16 at a position corresponding to a position between the first and third permanent magnets 20 (permanent magnets 21). Thus, torque pulsation is reduced compared to when the grooves 24*a* and 24*b* both have the same width.

(5) Each of the grooves 24*a* and 24*b* includes the arcuate bottom surface 26 and the planar side surfaces 27 that are continuous with the bottom surface 26. The arcuate bottom surfaces 26 of the grooves 24*a* and 24*b* effectively reduce the concentration of stress.

(6) The bottom surfaces 26 of the grooves 24*a* and 24*b* are formed as arcuate surfaces having the same radius of curvature. The stress reduction effect differs in accordance with the radius of curvature of the bottom surface 26. Thus, when the bottom surface 26 of the grooves 24*a* and 24*b* have different radius of curvatures and the radius of curvature of the bottom surface 26 of one of the grooves 24*a* and 24*b* is set to obtain the maximum stress reduction effect, the bottom surface 26 of the other one of the grooves 24*a* and 24*b* will obtain a relatively inferior stress reduction effect. However, when the bottom surfaces 26 of the grooves 24*a* and 24*b* have the same radius of curvature, the bottom surfaces 26 of the grooves 24*a* and 24*b* will both have the same stress reduction effect.

(7) The bottom surfaces 26 of the grooves 24*a* and 24*b* are located at the radially outer side of the hypothetical line 25 that connects the radially outer surfaces of the permanent magnets 20 and 21. When the bottom surfaces 26 of the grooves 24*a* and 24*b* are located at the radially inner side of the hypothetical line 25, the rotation of the rotor core 16 produces centrifugal force that acts on the permanent magnets 20 and 21. This suddenly increases the stress at the support points of the rotor core 16 that are opposed to the bottom surfaces 26 of the grooves 24*a* and 24*b*. Thus, it is preferred that the bottom surfaces 26 of the grooves 24*a* and 24*b* be located at the radially outer side of the hypothetical line 25 that connects the radially outer surfaces of the permanent magnets 20 and 21.

(8) The IPM motor 10 is used as a rotating electric machine for a centrifugal compressor. The IPM motor 10 is suitable for high-speed rotation and may thus be effectively used as a rotating electric machine for a centrifugal compressor.

It should be apparent to those skilled in the art that the present invention may be embodied in many other specific forms without departing from the spirit or scope of the invention. Particularly, it should be understood that the present invention may be embodied in the following forms.

Figure 4:
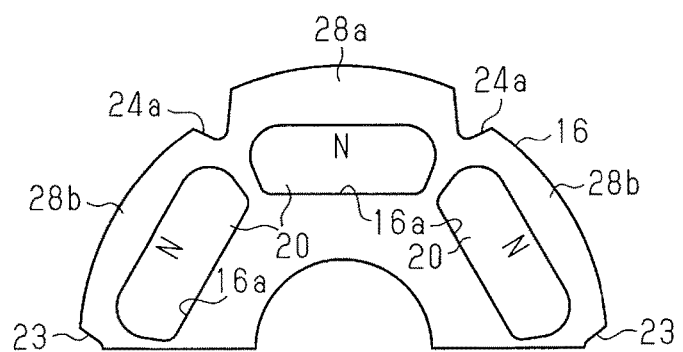
FIG. 4 is a schematic view showing a portion of a rotor in a further embodiment.

In the circumferential direction, the rotor core portion 28*a* does not have to be partially thicker than the rotor core portion 28*b*. For example, as shown in FIG. 4, the entire rotor core portion 28*a* in the circumferential direction may be thicker than the rotor core portion 28*b*, and the thickness of the rotor core portion 28*a* may be uniform. More specifically, the first N-pole corresponding section and the first S-pole corresponding section may be wider in the radial direction than the second N-pole corresponding section and the second S-pole corresponding section. Further, the first N-pole corresponding section and the first S-pole corresponding section may each have a uniform thickness.

When the rotor core portion 28a is entirely thicker than the rotor core portion 28b, the thickness of the rotor core portion 28a may gradually increase from the trailing end toward the leading end.

When the rotor core portion 28a is partially thicker than the rotor core portion 28b, a plurality of thick parts may be formed in a non-continuous manner. Each thick part may have a thickness that is uniform or a thickness that is varied.

The rotor core 16 may include three or more permanent magnets 20 having the same poles opposed to the stator 12 and three or more permanent magnets 21 having the same poles opposed to the stator 12. FIG. 4 shows an example in which there are three permanent magnets 20 and three permanent magnets 21.

The grooves 24b only need to be narrower than the grooves 24a. Thus, the radius of curvature of the bottom surface 26 of each groove 24b may differ from the radius of curvature of the bottom surface 26 of each groove 24a.

The grooves 24b do not have to be shaped so that the side surfaces 27 each include one or two planar surfaces. Each side surface may be bent to include three or more planar surfaces.

The grooves 24b may be shaped so that the side surfaces 27 each includes a planar surface and a curved surface. For example, each groove 24b may be shaped so that the side surface 27 includes a planar surface that extends in a direction intersecting the tangential direction of the bottom surface 26 and a curved surface that smoothly connects the planar surface and the bottom surface.

The two side surfaces 27 of each of the grooves 24a and 24b may be symmetric or non-symmetric with respect to the hypothetical plane that lies along rotation axis of the rotor core 16 and bisects the bottom surface 26.

The permanent magnets 20 and 21 do not have to be shaped as illustrated in the above embodiment in which the two corners at the side corresponding to the stator 12 have a larger radius of curvature than the two corners at the opposite side. For example, the permanent magnets 20 and 21 may be rectangular. When the permanent magnets 20 and 21 are rectangular, the four corners may be rounded to have a small radius of curvature or in which two opposite ends are arcuate.

The grooves 24a and 24b may be shaped identically to the groove 23. Further, the grooves 24a and 23 may be shaped identically or shaped differently.

The grooves 24a and 24b in the outer circumferential portion of the rotor core 16 located between the permanent magnets 20 and between the permanent magnets 21 do not all necessarily have to be located between adjacent permanent magnets 20 and 21. Some of the grooves 24a and 24b may be eliminated. Further, the grooves 24a and 24b may all be eliminated.

The present examples and embodiments are to be considered as illustrative and not restrictive, and the invention is not to be limited to the details given herein, but may be modified within the scope and equivalence of the appended claims.

The invention claimed is:

1. A permanent magnet type rotating electric machine comprising:
   a stator;
   a rotor core including magnet insertion holes; and
   permanent magnets respectively inserted into the magnet insertion holes and fixed to the rotor core, wherein
   the permanent magnets include N-pole magnets, each of which an N-pole is opposed to the stator, and S-pole magnets, each of which an S-pole is opposed to the stator,
   three or more of the N-pole magnets are arranged adjacent to one another in a circumferential direction and form a first set,
   three or more of the S-pole magnets are arranged adjacent to one another in the circumferential direction and form a second set,
   the first set and the second set are arranged along the same circumference,
   the rotor core includes an outer circumferential portion located at an outer side of the magnet insertion holes in a radial direction,
   the outer circumferential portion includes grooves arranged in the circumferential direction and arranged to open radially outward, each groove corresponding to a portion between corresponding two of the permanent magnets,
   the outer circumferential portion includes a first N-pole corresponding section that corresponds to one of the N-pole magnets that is not adjacent to any of the S-pole magnets, a second N-pole corresponding section that corresponds to one of the N-pole magnets that is adjacent to one of the S-pole magnets, a first S-pole corresponding section that corresponds to one of the S-pole magnets that is not adjacent to any of the N-pole magnets, and a second S-pole corresponding section that corresponds to one of the S-pole magnets that is adjacent to one of the N-pole magnets,
   each of the first N-pole corresponding section, the second N-pole corresponding section, the first S-pole corresponding section, and the second S-pole corresponding section is located between corresponding two of the grooves,
   the first N-pole corresponding section includes a leading end located at a leading side with respect to a rotation direction of the rotor core and continuous with one of the corresponding two of the grooves, the leading end of the first N-pole corresponding section extending radially outward beyond an outer circumferential surface of the second N-pole corresponding section so that the leading end of the first N-pole corresponding section is wider in the radial direction than the second N-pole corresponding section, and
   the first S-pole corresponding section includes a leading end located at a leading side with respect to a rotation direction of the rotor core and continuous with another of the corresponding two of the grooves, the leading end of the first S-pole corresponding section extending radially outward beyond an outer circumferential surface of the second S-pole corresponding section so that the leading end of the first S-pole corresponding section is wider in the radial direction than the second S-pole corresponding section.

2. The permanent magnet type rotating electric machine according to claim 1, wherein
   the first N-pole corresponding section and the first S-pole corresponding section each further include a trailing end located at a trailing side with respect to the rotation direction of the rotor core, and
   the leading end is wider in the radial direction than the trailing end.

3. The permanent magnet type rotating electric machine according to claim 2, wherein the first N-pole corresponding section and the first S-pole corresponding section each gradually widens in the radial direction toward the leading end from a middle portion between the leading end and the trailing end.

4. The permanent magnet type rotating electric machine according to claim 1, wherein the first N-pole corresponding section and the first S-pole corresponding section in the circumferential direction are each entirely wider in the radial direction than the second N-pole corresponding section and the second S-pole corresponding section.

5. The permanent magnet type rotating electric machine according to claim 4, wherein the first N-pole corresponding section and the first S-pole corresponding section each extends in the circumferential direction with a uniform width in the radial direction.

6. The permanent magnet type rotating electric machine according to claim 1, wherein the permanent magnet type rotating electric machine is a rotating electric machine for a centrifugal compressor.

7. The permanent magnet type rotating electric machine according to claim 1,
wherein the second N-pole corresponding section includes a trailing end located at a trailing side with respect to the rotation direction of the rotor core, the trailing end of the second N-pole corresponding section lies on a circumference of the rotor core, the grooves are located within the circumference, and the leading end of the first N-pole corresponding section extends radially outward beyond the circumference, and
wherein the second S-pole corresponding section includes a trailing end located at a trailing side with respect to the rotation direction of the rotor core, the trailing end of the second S-pole corresponding section lies on the circumference, the grooves are located within the circumference, and the leading end of the first S-pole corresponding section extends radially outward beyond the circumference.

8. The permanent magnet type rotating electric machine according to claim 1,
wherein the one groove of the corresponding two of the grooves, which is arranged between the first N-pole corresponding section and the second N-pole corresponding section, includes a first side surface and a second side surface, wherein the first side surface is longer in the radial direction than the second side surface, and
wherein the other groove of the corresponding two of the grooves, which is arranged between the first S-pole corresponding section and the second S-pole corresponding section, includes a first side surface and a second side surface, wherein the first side surface is longer in the radial direction than the second side surface.

* * * * *